United States Patent
Nakamae

(10) Patent No.: US 10,102,614 B2
(45) Date of Patent: Oct. 16, 2018

(54) FOG REMOVING DEVICE AND IMAGE GENERATING METHOD

(71) Applicant: EIZO Corporation, Ishikawa (JP)

(72) Inventor: Takashi Nakamae, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 1 day.

(21) Appl. No.: 15/371,228

(22) Filed: Dec. 7, 2016

(65) Prior Publication Data

US 2017/0084042 A1   Mar. 23, 2017

Related U.S. Application Data

(63) Continuation of application No. PCT/JP2014/003131, filed on Jun. 12, 2014.

(51) Int. Cl.
*G06K 9/40* (2006.01)
*G06T 5/00* (2006.01)
*H04N 1/407* (2006.01)
*G06T 7/00* (2017.01)
*G06T 7/11* (2017.01)

(52) U.S. Cl.
CPC ............. *G06T 5/005* (2013.01); *G06T 5/003* (2013.01); *G06T 7/0085* (2013.01); *G06T 7/11* (2017.01); *H04N 1/407* (2013.01); *G06T 2207/10004* (2013.01); *G06T 2207/20192* (2013.01)

(58) Field of Classification Search
USPC ................. 1/1; 345/419, 590, 690; 348/241; 382/104, 167, 254
See application file for complete search history.

(56) References Cited

U.S. PATENT DOCUMENTS

| | | |
|---|---|---|
| 6,085,152 A | 7/2000 | Doerfel |
| 7,161,614 B1 | 1/2007 | Yamashita et al. |
| 7,656,277 B2 | 2/2010 | Kawasaki |

(Continued)

FOREIGN PATENT DOCUMENTS

| | | |
|---|---|---|
| CN | 202872972 U | 4/2013 |
| CN | 103337054 A | 10/2013 |

(Continued)

OTHER PUBLICATIONS

Kazuyasu Owaki et al., "ContrastMagic technology to optimize image brightness and contrast", Toshiba Review, Jun. 1, 2009, vol. 64, No. 6, pp. 19 to 22.

(Continued)

*Primary Examiner* — Xuemei Chen

(57) ABSTRACT

To allow fog removal even in a densely foggy image. A fog density calculating unit 11 calculates the fog density of an input image given, by using a separated illumination light component. A reflectance component fog removing unit 13 performs fog removal on a reflectance component calculated by a reflectance calculating unit. An illumination light component fog removing unit 14 performs fog removal on the separated illumination light component. Here, the degree of fog removal by the reflectance component fog removing unit 13 is higher than the degree of fog removal by the illumination light component fog removing unit 14. Thereby, the degree of fog removal of the reflectance component can be raised without significantly raising the level of fog removal of the illumination light component.

5 Claims, 2 Drawing Sheets

(56) References Cited

U.S. PATENT DOCUMENTS

| | | | |
|---|---|---|---|
| 8,249,303 B2* | 8/2012 | Nitanda | G06T 5/002 |
| | | | 382/104 |
| 8,290,294 B2* | 10/2012 | Kopf | G06K 9/00624 |
| | | | 382/167 |
| 8,350,933 B2* | 1/2013 | Fattal | G06T 5/003 |
| | | | 348/241 |
| 8,619,071 B2* | 12/2013 | Kopf | G06T 15/20 |
| | | | 345/419 |
| 8,885,962 B1* | 11/2014 | Mudge | G01J 4/04 |
| | | | 382/254 |
| 8,908,990 B2* | 12/2014 | Fukunaga | H04N 1/62 |
| | | | 345/690 |
| 8,970,691 B2* | 3/2015 | Omer | G06T 5/008 |
| | | | 345/419 |
| 9,076,389 B2 | 7/2015 | Haraguchi et al. | |
| 9,177,363 B1 | 11/2015 | Huang et al. | |
| 9,305,339 B2 | 4/2016 | Yang et al. | |
| 9,336,581 B2* | 5/2016 | Abe | G09G 5/02 |
| 9,384,532 B2 | 7/2016 | Hong et al. | |
| 9,418,402 B2 | 8/2016 | Hong et al. | |
| 9,473,692 B2 | 10/2016 | Saito et al. | |
| 9,646,364 B1 | 5/2017 | Wang et al. | |
| 9,691,141 B2* | 6/2017 | Shin | G06T 3/4015 |
| 9,870,511 B2 | 1/2018 | Mittal et al. | |
| 2007/0225560 A1 | 9/2007 | Avni et al. | |
| 2008/0170754 A1 | 7/2008 | Kawasaki | |
| 2010/0259651 A1 | 10/2010 | Fattal | |
| 2010/0322478 A1 | 12/2010 | Nitanda | |
| 2011/0090216 A1 | 4/2011 | Yamada et al. | |
| 2011/0135200 A1 | 6/2011 | Chen et al. | |
| 2011/0261261 A1 | 10/2011 | Mori et al. | |
| 2012/0002871 A1 | 1/2012 | Hu et al. | |
| 2012/0019692 A1 | 1/2012 | Tatsuzawa | |
| 2012/0213436 A1* | 8/2012 | Grindstaff | G06T 5/008 |
| | | | 382/167 |
| 2012/0301033 A1 | 11/2012 | Fukunaga | |
| 2012/0328205 A1 | 12/2012 | Wen et al. | |
| 2013/0141594 A1 | 6/2013 | Hartley et al. | |
| 2013/0237317 A1 | 9/2013 | Rychagov et al. | |
| 2014/0140619 A1 | 5/2014 | Mukhopadhyay et al. | |
| 2014/0177960 A1 | 6/2014 | Park et al. | |
| 2015/0123985 A1* | 5/2015 | Abe | G06T 5/008 |
| | | | 345/590 |
| 2015/0279011 A1 | 10/2015 | Jeon et al. | |
| 2016/0196640 A1 | 7/2016 | Kino | |
| 2016/0314371 A1* | 10/2016 | Wang | H04N 19/136 |
| 2017/0132761 A1 | 5/2017 | Wang et al. | |
| 2017/0178297 A1* | 6/2017 | Fattal | G06T 5/003 |

FOREIGN PATENT DOCUMENTS

| | | |
|---|---|---|
| CN | 103632339 A | 3/2014 |
| JP | 2012-168936 A | 9/2012 |
| JP | 2013-152334 A | 8/2013 |
| RU | 2365993 C1 | 8/2009 |

OTHER PUBLICATIONS

Kaiming He et al., Single Image Haze Removal Using Dark Channel Prior, IEEE Transactions on Pattern Analysis and Machine Intelligence (TPAMI), Dec. 2011, vol. 33, No. 12, pp. 2341-2353.
International Search Report for International Application No. PCT/JP2014/003131, issued by the Japan Patent Office dated Jul. 22, 2014.
Vadivel A et al:"Object Level Frame Comparison for Video Shot Detection", 2005 Seventh IEEE Workshops on Applications of Computer Vision(WACV/Motion'05)—Jan. 5-7, 2005—Breckenridge, CO, USA, IEEE, Los Alamitos, Calif., USA, Jan. 5, 2005, pp. 235-240, XP032120906 DOI: 10.1109/ACVMOT.2005.86 ISBN:978-0-7695-2271-5 *section 2.1*.
Dubok Park et al:"Fog-degraded image restoration using characteristics of RGB channel in single monocular image", Consumer Electronics (ICCE), 2012 IEEE International Conference on, IEEE, Jan. 13, 2012, pp. 139-140, XP032124856, DOI:10.1109/ICCE.2012.6161832 ISBN:978-1-4577-0230-3 *sections II.A, II.B and II.C; figures 1, 2*.
Kim Jin-Hwan et al:"Optimized contrast enhancement for real-time image and video dehazing", Journal of Visual Communication and Image Representation, Academic Press, Inc, US, vol. 24, No. 3, Feb. 18, 2013, pp. 410-425, XP028996774, ISSN:1047-3203, DOI:10.1016/J.JVCIR.2013.02.004 *section 4.1*.
Yeo B-L et al:"Rapid Scene Analysis on Compressed Video", IEEE Transactions on Circuits and Systems for Video Technology, IEEE Service Center, Piscataway, NJ, US, vol. 5, No. 6, Dec. 1, 1995, pp. 533-544, XP000545960, ISSN:1051-8215, DOI:10.1109/76.475896 *section I.*.
Partial Supplementary European Search Report for European Patent Application No. 15805972.5, issued by the European Patent Office dated Jun. 12, 2017.
Extended European Search Report for European Patent Application No. 15806110.1, issued by the European Patent Office dated Jun. 8, 2017.
Extended European Search Report for European Patent Application No. 15807220.7, issued by the European Patent Office dated Jun. 8, 2017.
Renjie He et al:"Single Image Dehazing with White Balance Correction and Image Decomposition",Digital Image Computing Techniques and Applications (DICTA),2012 International Conference on, IEEE, Dec. 3, 2012,pp. 1-7,XP032310805,DOI:10.1109/DICTA.2012.6411690, ISBN:978-1-4673-2180-8, *Sectioin II. The proposed Algorithm*.
Sudharsan Parthasarathy et al:"A Retinex based haze removal method",Industrial and Information Systems (ICIIS),2012 7th IEEE Internaitonal Conference on, IEEE, Aug. 6, 2012, pp. 1-6,XP032237754,DOI:10.1109/ICIINFS.2012.6304767,ISBN:978-1-4673-2603-2,*Section IV. Retinex based Enhancement*.
Bin-Na Yu et al:"Visibility Enhancement Based Real-Time Retinex for Diverse Environment",Signal Image Technology and Internet Based Systems (SITIS),2012 Eighth International Conference on, IEEE, Nov. 25, 2012, pp. 72-79,XP032348495,DOI:10.1109/SITIS.2012.22,ISBN:978-1-4673-5152-2,*Section III. Proposed Method*.
Chen-Jui Chung et al:"Under-exposed image enhancement using exposure compensation",2013 13th International Conference on ITS Telecommunications (ITST),IEEE, Nov. 5, 2013, pp. 204-209,XP032532134,DOI:10.1109/ITST.2013.6685546[retrieved on Dec. 16, 2013],*3.Proposed Method*.
Extended European Search Report for European Patent Application No. 14894614.8, issued by the European Patent Office dated Feb. 24, 2017.
International Search Report for International Application No. PCT/JP2015/062729, issued by the Japan Patent Office dated Jun. 30, 2015.
International Preliminary Report on Patentability for International Application No. PCT/JP2015/056086, issued by the International Bureau of WIPO dated Dec. 22, 2016.
International Preliminary Report on Patentability for International Application No. PCT/JP2015/062729, issued by the International Bureau of WIPO dated Dec. 22, 2016.
Extended European Search Report for European Patent Application No. 15 805 972.5, issued by the European Patent Office dated Sep. 12, 2017.
Office Action issued for counterpart Australian Application 2015272846, issued by the Australian Patent Office dated Sep. 28, 2017.
Koprinska, I. et al., "Temporal video segmentation: A survey", Signal Processing. Image Communication, Elsevier Science Publishers, Amsterdam, NL, (Jan. 1, 2001), vol. 16, No. 5, doi:10.1016/S0923-5965(00) 00011-4, ISSN 0923-5965, pp. 477-500.
Fu Xueyang et al:"A novel retinex based approach for image enhancement with illumination adjustment", 2014 IEEE International Conference on Acoustics,Speech and Signal Processing (ICASSP),IEEE, May 4, 2014, pp. 1190-1194, XP032617073,DOI:10.1109/ICASSP.2014.6853785[retrieved on Jul. 11, 2014]*p. 1191-p. 1192*.

(56) References Cited

OTHER PUBLICATIONS

Office Action issued for counterpart Australian Application No. 2015272798, issued by the Australian Patent Office dated Aug. 9, 2017.
Office Action issued for counterpart Australian Application No. 2015272799, issued by the Australian Patent Office dated Aug. 28, 2017.
Office Action for European Patent Application No. 14 894 614.8, issued by the European Patent Office dated Aug. 29, 2017.
Office Action issued for counterpart European Patent Application No. 15 806 110.1, issued by the European Patent Office dated Apr. 25, 2018.
Office Action issued for counterpart Australian Application 2014397095, issued by the Australian Patent Office dated Apr. 27, 2018.
Office Action issued for counterpart U.S. Appl. No. 15/371,230, issued by the USPTO dated Mar. 29, 2018.
Office Action issued for counterpart European Application No. 14894614.8, issued by the European Patent Office dated Mar. 12, 2018.
Office Action issued for counterpart U.S. Appl. No. 15/372,402, issued by the USPTO dated Jan. 22, 2018.
Office Action issued for counterpart Australian Application No. 2014397095, issued by the Australian Patent Office dated Jan. 9, 2018.
Office Action issued for counterpart Russian Application No. 2017100018, issued by the Russian PTO dated Jan. 25, 2018.
Office Action issued for counterpart Chinese Application 201580031438.9, issued by the Chinese Intellectual Property Office dated Aug. 15, 2018.
Shu Ting et al., "Defogging Algorithm Based on the Prior Dark-Channel and Theory of Retinex", Journal of Jishou University (Natural Science Edition), Mar. 31, 2014, vol. 35, Issue No. 2, College of Physics and Mechanical&Electrical Engineering, Jishou University, Jishou 416000, Hunan, China.

* cited by examiner

FOG REMOVING DEVICE AND IMAGE GENERATING METHOD

The contents of the following patent applications are incorporated herein by reference: No. PCT/JP2014/003131 filed on Jun. 12, 2014.

BACKGROUND

1. Technical Field

The present invention relates to a fog removing device, and in particular relates to a wide range of fog removing techniques.

2. Related Art

Japanese Patent Application Publication No. 2012-168936 discloses a fog removing technique based on an atmospheric model (please see the section RELATED ART). An atmospheric model is an optical principle which is utilized when an image of an object is captured by an image-capturing apparatus or an object is observed with naked eyes when airborne particles are present in an atmosphere. An atmospheric model is expressed with Equation (1).

$$I(x)=J(x)t(x)+A(1-t(x)) \quad \text{Equation (1)}$$

I denotes an observation image (image including fog), J denotes a processed image (image not including fog), t denotes the fog density, x denotes the coordinate of a target pixel and A denotes airglow.

An image I(x) observed by an image-capturing apparatus is configured with: a portion J(x)t(x) including reflected light J(x) from an object remaining even after being scattered by airborne particles in the air; and atmospheric light A(1−t(x)) which has resulted from sunlight having been scattered by the airborne particles in the air.

FIG. 10 of the above-mentioned Japanese patent application publication provides an explanation using an image having respective values of I(x), J(x), A and t(x).

By obtaining the fog density t and the airglow A with Equation (1), the processed image J can be obtained from the observation image I.

Kaiming He et. al, proposed a novel fog removing technique in their paper "Single Image Haze Removal Using Dark Channel Prior" at IEEE Conference on Computer Vision and Pattern Recognition, 2009.

To explain it simply, assuming in the atmospheric model that the minimum value of pixel values of each pixel and surrounding pixels thereof, which minimum value is obtained with Equation (2) (Dark Channel Prior, abbreviated to DCP hereinafter), represents the fog density, the degree of fog removal is changed according to the value of the DCP.

$$DCP(x) = \min_{c \in r,g,b}\left(\min_{y \in \Omega(x)}(I^C(y))\right) \quad \text{[Equation 1]}$$

This provides the DCP value of approximately 0 because a general natural image not including fog has a shadow or a portion with a high chroma around any pixel. On the other hand, in an image including fog, the luminance is raised due to the fog, and this raises the DCP value. Accordingly, fog removal becomes possible by performing a process so as to make the DCP value 0.

However, the above-mentioned fog removal approach has the following drawbacks. A densely foggy image has few color components, and no undulation. In such an image, the value of DCP and an input image become close, and performing a process so as to make the DCP value 0 results in a very dark processed image. Conversely, setting low parameters to prevent an image from becoming dark lessens the fog removal effect, and presents a drawback of not being able to make the image clear.

An object of the present invention is to solve the above-mentioned drawbacks and to provide a fog removing device to perform fog removal from an image including fog.

SUMMARY (1) A fog removing device according to the present invention includes:
 a separating means that separates, in a fog-containing image, a reflectance component and an illumination light component;
 a reflectance component fog removing means that removes fog based on a fog density separately determined for the separated reflectance component;
 an illumination light component fog removing means that removes fog based on the fog density for the separated illumination light component; and
 a synthesizing means that synthesizes a reflectance component after the fog removal and an illumination light component after the fog removal, wherein
 degrees of fog removal are different between the fog removal in the reflectance component fog removing means and the fog removal in the illumination light component fog removing means.

In this manner, by synthesizing the reflectance component and illumination light component while making the degrees of fog removal different therebetween, a more flexible fog removing process becomes possible.

(2) In the fog removing device according to the present invention, the degree of fog removal of the fog removal in the reflectance component fog removing means is higher than the degree of fog removal of the fog removal in the illumination light component fog removing means. Accordingly, even if the fog is dense, an image in which an edge is enhanced, and the entire brightness is maintained can be obtained.

(3) In the fog removing device according to the present invention, the degree of fog removal of the fog removal in the illumination light component fog removing means is higher than the degree of fog removal of the fog removal in the reflectance component fog removing means. Accordingly, an image on which edge enhancement is not performed can be obtained while lowering the brightness of the entire image.

(4) An image generating method according to the present invention, includes:
 separating, in a fog-containing image, a reflectance component and an illumination light component;
 removing fog based on a fog density separately determined for the reflectance component;
 removing fog based on the fog density for the illumination light component; and
 synthesizing a reflectance component after the fog removal and an illumination light component after the fog removal, wherein
 an image having different degrees of fog removal is generated by a fog removing process on the reflectance component and a fog removing process on the illumination light component. Accordingly, an image in which the degrees of fog removal are made different between the reflectance component and the illumination light component can be generated.

(5) A fog removing device according to the present invention includes:
a separating means that separates, in a fog-containing image, a reflectance component and an illumination light component;
a reflectance component fog removing means that removes fog based on a fog density separately determined for the separated reflectance component;
an illumination light component fog removing means that removes fog based on the fog density for the separated illumination light component; and
a synthesizing means that synthesizes a reflectance component after the fog removal and an illumination light component after the fog removal. Thereby, the fog removing processes independently for the reflectance component and the illumination light component become possible.

(6) A fog removing device according to the present invention includes:
a separating means that separates, in a fog-containing image, a reflectance component and an illumination light component;
a reflectance component fog removing means that removes fog based on a fog density separately determined for the separated reflectance component; and
a synthesizing means that synthesizes the separated illumination light component and a reflectance component after the fog removal. Accordingly, an image in which the fog removing process has been performed only on a reflectance component can be generated.

(7) A fog removing device according to the present invention includes:
a separating means that separates, in a fog-containing image, a reflectance component and an illumination light component;
an illumination light component fog removing means that removes fog based on a fog density separately determined for the separated illumination light component; and
a synthesizing means that synthesizes an illumination light component after the fog removal and the separated reflectance component. Accordingly, an image in which the fog removing process has been performed only on an illumination light component can be generated.

"Fog" in the present specification is a concept also including haze, mist, smoke, powdery dust, dust, rain and snow.

Correspondences between various means described in the claims and configurations in embodiments are explained. A "calculating means" corresponds to a fog density calculating unit 11. A "separating means" corresponds to an illumination light separating unit 4. A "reflectance component fog removing means" corresponds to a reflectance component fog removing unit 13, and an "illumination light component fog removing means" corresponds to an illumination light component fog removing unit 14. A "synthesizing means" corresponds to a synthesizing unit 16.

Features, other objectives, uses, effects, etc. of the present invention will become apparent by considering the embodiments and figures.

BEST MODE FOR CARRYING OUT THE INVENTION

Figure 1:
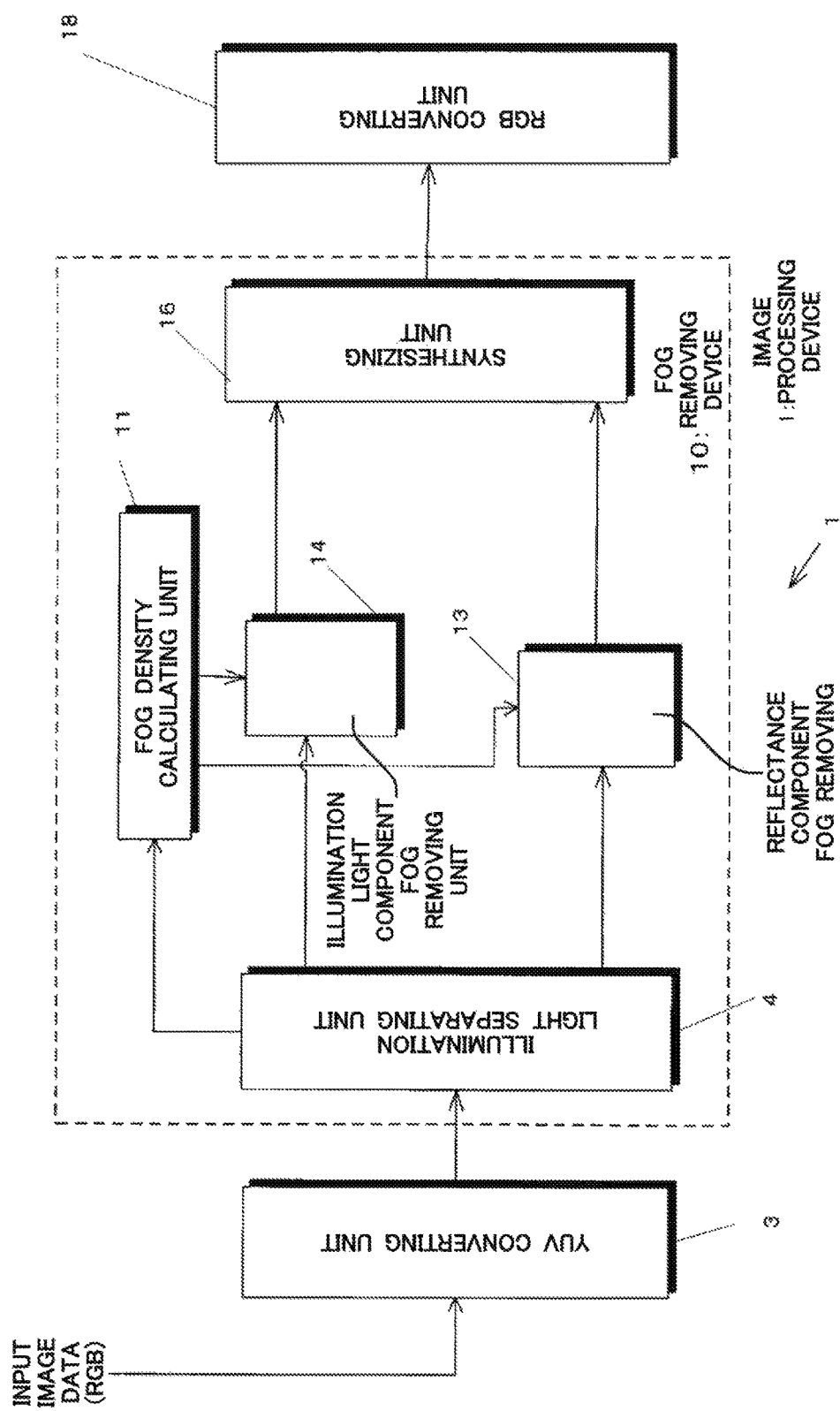
FIG. 1 shows a configuration of an image processing device 1.

Hereinafter, embodiments in the present invention are explained with reference to the figures. FIG. 1 shows a configuration of an image processing device 1 having a fog removing device 10 according to a first embodiment of the present invention.

The fog removing device 10 includes an illumination light separating unit 4, a reflectance component fog removing unit 13, an illumination light component fog removing unit 14, a fog density calculating unit 11 and a synthesizing unit 16.

The illumination light separating unit 4 has an edge-preserving low pass filter, and at a YUV converting unit 3, a weighted average value of local brightness of converted YUV data, that is, an illumination light component is calculated, thereby separating the illumination light component from a reflectance component.

The fog density calculating unit 11 calculates the fog density of an input image given, by using the separated illumination light component. In the present embodiment, the final fog density t is obtained from a DCP value assuming that the DCP explained in RELATED ART represents the fog density.

The reflectance component fog removing unit 13 performs fog removal on a reflectance component calculated by the reflectance calculating unit. The illumination light component fog removing unit 14 performs fog removal on the separated illumination light component. The degrees of fog removal are different between the illumination light component fog removing unit 14 and the reflectance component fog removing unit 13. The details are explained below.

The synthesizing unit 16 performs synthesis to form an image from which fog has been removed, by using the illumination light component on which fog removal has been performed and the reflectance component on which fog removal has been performed. The image formed by the synthesis is converted from the YUV data into RGB data at an RGB converting unit 18.

The fog removal performed at the illumination light component fog removing unit 14 and the reflectance component fog removing unit 13 is explained.

In the Retinex theory, an observation image I is defined by the product of an illumination light L and a reflectance R.

$$I=RL \qquad \text{Equation (3)}$$

Modification of Equation (1) of the atmospheric model gives Equation (4).

$$J(x)=(I(x)-A)/t(x)+A \qquad \text{Equation (4)}$$

Here, by applying the Retinex theory to the above-mentioned I, J and A, and expressing them respectively with the product of the reflectance component and the illumination light component, Equation (5) is obtained.

$$J_R J_L=(I_R I_L - A_R A_L)/t + A_R A_L \qquad \text{Equation (5)}$$

Here, it is assumed in the atmospheric model that the airglow A does not include a reflectance component. Also, Equation (1) of the atmospheric model certainly holds true to the illumination light component. Accordingly, considering Equation (4) only about the illumination light component, the following two constraints can be set.

$$A_R=1 \qquad \text{Equation (6)}$$

$$J_L=(I_L-A_L)/t+A_L \qquad \text{Equation (7)}$$

By substituting Equations (6) and (7) for Equation (5), Equation (8) is derived.

$$JR=(IRIL-(1-t)AL)/(IL-(1-t)AL) \quad \text{Equation (8)}$$

According to Equation (8), the value of JR becomes larger than IR when IR>1, and smaller than IR when IR<1. That is, a process of enhancing an edge according to the fog density is performed on a reflectance component, and this is consistent with the fact that edges become dull due to fog.

In this manner, fog removal separate for an illumination light component and a reflectance component (fog removal for an illumination light component with Equation (7), and fog removal for a reflectance component with Equation (8)) becomes possible.

Figure 2:
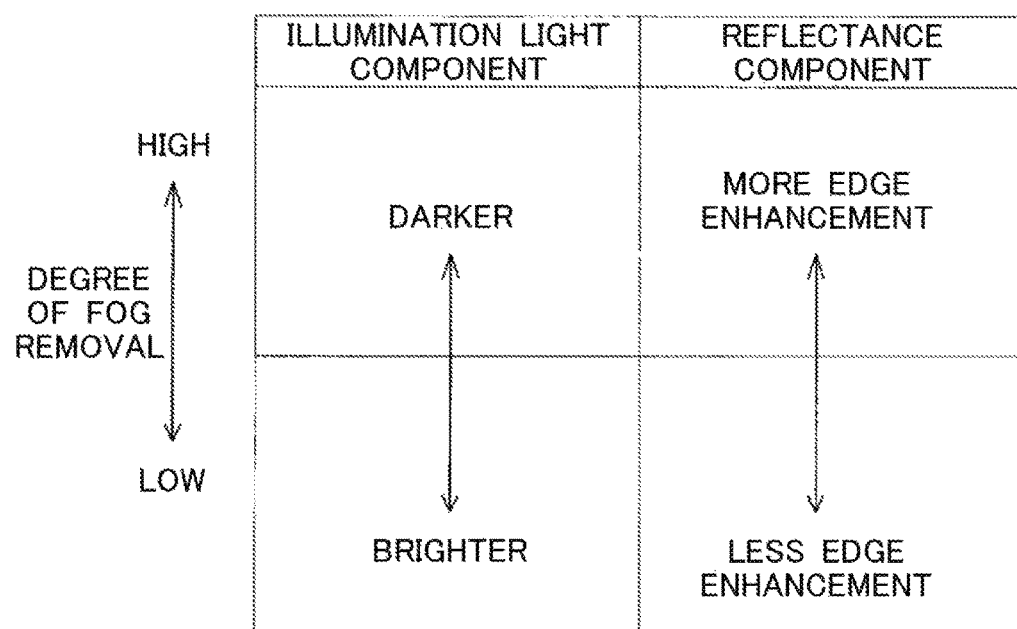
FIG. 2 shows a relationship between an illumination light component and a fog removal intensity, and between a reflectance component and a fog removal intensity.

Advantages brought about by being able to perform fog removal separately for an illumination light component and a reflectance component are explained with reference to FIG. 2. Raising the degree of fog removal raises the level of edge enhancement of a reflectance component, and lowers the brightness (luminance) of an illumination light component. Conversely, lowering the degree of fog removal lowers the level of edge enhancement of a reflectance component, and lowers the degree of decrease of an illumination light component. That is, it becomes not so dark. Accordingly, if the degree of fog removal is raised for an image with pale colors and less undulation due to dense fog, edges are enhanced, but the image becomes dark.

In contrast, even for such an image, the degree of fog removal can be raised for a reflectance component, and on the other hand, the degree of fog removal can be lowered for an illumination light component with the present approach. Accordingly, the visibility can be improved while maintaining the brightness of the image.

As such approaches to make the degrees of fog removal different between an illumination light component and a reflectance component, different values of fog density are used for respective fog removing processes on an illumination light component and a reflectance component, or respective fog removing process results of an illumination light component and a reflectance component are weighted.

In the former approach, for example, the values t may be made different from one another in Equation (7) and Equation (8). In a densely foggy image having a low (not high) average overall luminance, it is better to raise the degree of edge enhancement, but not to lower the luminance so much. Accordingly, when the illumination light component value t is tL, and the reflectance component value t is tR, tL and tR may satisfy the relationship tL>tR so as to lower the degree of fog removal for an illumination light component and raise the degree of fog removal for a reflectance component.

Also, weighting of fog removing process results may be performed in the following manner, for example.

Assuming that the illumination light component after fog removal is JL, and a result of weighting is JL', JL' is obtained with Equation (9).

$$JL'=IL+k(JL-IL) \quad \text{Equation (9)}$$

In Equation (9), the manner of weighting is made changeable, by not multiplying an obtained value with a coefficient, but by weighting a change amount from an original image with the use of a coefficient k. Specifically, when the level of fog removal of an illumination light component is to be lowered, it only needs to satisfy the relationship k<1.

In this manner, by separating an image that causes a visual recognition error into an illumination light component and a reflectance component in the Retinex theory, performing an image process so as to make the intensities of removing the error based on the atmospheric model different for the respective components, and then synthesizing the components, a process of mitigating the visual recognition error according to the respective components becomes possible. Although in the present embodiment, the luminance that corresponds to the degree by which an illumination light component became bright due to fog is lowered, and edges of a reflectance component that became dull due to fog are enhanced, a similar effect can be attained only by lowering the degree of a process on an illumination light component. This is because values of the brightness and edges are relative ones.

Also, separate adjustments of an illumination light component after fog removal and a reflectance component after fog removal can be applied in combinations other than this.

2. Other Embodiments

Although in the present embodiment, an example in which RGB values are once judged in YUV values has been explained, other color space models (such as HSV) may be employed. Values may be converted into RGB values when needed at a fog density calculation and/or a fog removing process.

Also, although in the present embodiment, an example in which fog removal is performed has been explained, the technique can be applied also to cases where external light components other than fog are to be removed.

Although in the present embodiment, a fog density is obtained as DCP, other approaches may be adopted to calculate a fog density, and also an operator may be allowed to manually adjust a fog density.

Although in the explanation above, the present invention was explained as preferred embodiments, the embodiments are not used for limitation, but for explanation. The embodiments can be modified within the scope of the appended claims without departing from the scope and spirit of the present invention.

EXPLANATION OF REFERENCE SYMBOLS

4: illumination light separating unit
13: reflectance component fog removing unit
14: illumination light component fog removing unit
16: synthesizing unit

What is claimed is:
1. An image generating method comprising:
separating, in a fog-containing image, a reflectance component and an illumination light component;
removing fog based on a fog density separately determined for the reflectance component;
removing fog based on the fog density for the illumination light component; and
synthesizing an image from which fog has been removed, by using a reflectance component after the fog removal and an illumination light component after the fog removal, wherein
under a condition that there is not a reflectance component in airglow and that an atmospheric model holds true to the illumination light component, the atmospheric model being expressed by an equation of $I(x)=J(x)t(x)+A(1-t(x))$ in which I denotes an observation image including fog and is defined by the product of an illumination light component IL and a reflectance component IR in a Retinex theory in which I, J and A satisfy the Retinex theory, J denotes a processed image not including fog, t denotes a fog density, x denotes the coordinate of a target pixel in the observation image and A denotes the airglow, fog removal is performed separately on the reflectance component and the illumination light component, by applying the Retinex theory to the I, J and A, as $JR=(IR*IL-(1-t)AL)/(IL-(1-t)AL)$ for the reflectance component and as $JL=(IL-AL)/t+AL$ for the illumination light component, wherein JR is a reflectance light component of a processed image not including fog, AL is the airglow due to the illumination light component, and JL is an illumination light component of the processed image not including fog, and degrees of fog removal are different between the reflectance component and the illumination light component due to different values being used for fog densities or due to different weighting of the reflectance component after fog removal and the illumination light component after fog removal.

2. The image generating method according to claim 1, wherein the degree of fog removal in the reflectance component is higher than the degree of fog removal in the illumination light component.

3. The image generating method according to claim 1, wherein the degree of fog removal in the illumination light component is higher than the degree of fog removal in the reflectance component.

4. The image generating method according to claim 1, wherein the degree of fog removal is due to different values being used for fog densities in respective reflectance component and illumination light component.

5. The image generating method according to claim 1, wherein the degree of fog removal is due to weighting in respective fog removing process results of the reflectance component and the illumination light component.

* * * * *